US005289210A

United States Patent [19]

Takayanagi

[11] Patent Number: 5,289,210

[45] Date of Patent: Feb. 22, 1994

[54] IMAGE RECORDING APPARATUS

[75] Inventor: Yoshiaki Takayanagi, Yokohama, Japan

[73] Assignee: Canon Kabushiki Kaisha, Tokyo, Japan

[21] Appl. No.: 818,765

[22] Filed: Jan. 13, 1992

[30] Foreign Application Priority Data

Jan. 14, 1991 [JP] Japan .................................. 3-002841

[51] Int. Cl.[5] ........................ G01D 15/16; G01D 15/18

[52] U.S. Cl. .................................. 346/140 R; 400/175

[58] Field of Search ............... 346/1.1, 140 R, 76 PH; 355/204, 208, 207, 205; 400/175

[56] References Cited

U.S. PATENT DOCUMENTS

| | | | |
|---|---|---|---|
| 4,313,124 | 1/1982 | Hara | 346/140 R |
| 4,345,262 | 9/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,949,342 | 8/1990 | Shimbo et al. | 371/40.1 |
| 5,038,208 | 8/1991 | Ichikawa et al. | 346/1.1 X |
| 5,049,898 | 9/1991 | Arthur et al. | 346/1.1 |

FOREIGN PATENT DOCUMENTS

| | | |
|---|---|---|
| 59-123670 | 7/1984 | Japan . |
| 59-138461 | 8/1984 | Japan . |

*Primary Examiner*—A. T. Grimley

*Assistant Examiner*—Sandra L. Brasé

*Attorney, Agent, or Firm*—Fitzpatrick, Cella, Harper & Scinto

[57] ABSTRACT

There is disclosed an image recording apparatus with a detachable recording head. The head is equipped with a non-volatile memory which contains data representing the recording characteristics of the head and data (check sum or parity data) enabling to identify whether the head matches the apparatus. At the start of power supply, the recording apparatus reads these data and identifies whether a matching head is mounted.

27 Claims, 20 Drawing Sheets

(VARIOUS DATA)

| SYMBOL | NUMBER OF STRUCTURAL BITS | MEANING |
|---|---|---|
| SENS | 4 | DISTINCTION OF CHARACTERISTICS OF SENSOR |
| T 1 | 4 | DRIVING PULSE P1 |
| T 2 | 4 | DRIVING PULSE P2 |
| I D | 20 | HEAD PRODUCTION NO. |
| COLR | 2 | INK COLOR |

Pn : PARITY BIT

Cn : CHECK SUM DATA (LOWER SIGNIFICANT DIGIT, 6 BITS EFFECTIVE)

even : EVEN PARITY

IMAGE RECORDING APPARATUS

BACKGROUND OF THE INVENTION

1. Field of the Invention

The present invention relates to an image recording apparatus, and more particularly to an image recording apparatus with a detachable recording head.

2. Related Background Art

Among ink jet recording apparatus, there are already available monochromatic printers and color printers, both employing an ink jet recording head, as already known, with a uniform array of plural nozzles. Such recording head has generally been associated with an unevenness in density in the recording of a halftone image, due to errors in the ink discharge amount of different nozzles or in the ink depositing positions thereof. Such errors do not affect the print quality significantly in monochromatic printers used principally for character printing, but are a serious problem in color printers employed for color graphics or ordinary pictures.

Since such uneveness in density is specific to each recording head, it is too tedious to prepare the recording apparatus in consideration of the characteristic of each recording head, and the recording apparatus will become unable to match the recording head when it is replaced in the future.

It is therefore conceivable to incorporate, in each detachable (or disposable) head, data for correcting the unevenness in density of said head, and to control the image recording according to said data. Such configuration will enable satisfactory image recording matching the recording head, even in case of replacement thereof, without any change in the recording apparatus.

However, such configuration is still associated with a drawback that such advantage cannot be obtained if the data in the recording head are destructed for some reason, or if a recording head, not originally intended for the recording apparatus, is mounted.

SUMMARY OF THE INVENTION

In consideration of the foregoing, an object of the present invention is to provide an improved image recording apparatus.

Another object of the present invention is to provide an image recording apparatus capable of identifying whether the mounted recording head is proper, normal or otherwise.

Still another object of the present invention is to provide an image recording apparatus employing a detachable recording head storing therein data of recording characteristics specific to said head, said apparatus being capable of identifying whether the recording head is proper or not, by detecting whether said recording characteristic data are normal or not.

Still other objects of the present invention, and the advantages thereof, will become fully apparent from the following description which is to be taken in conjunction with the attached drawings.

DESCRIPTION OF THE PREFERRED EMBODIMENTS

Now the present invention will be clarified in detail by an embodiment thereof shown in the attached drawings.

[CONFIGURATION OF APPARATUS (FIG. 1)]

Figure 1:
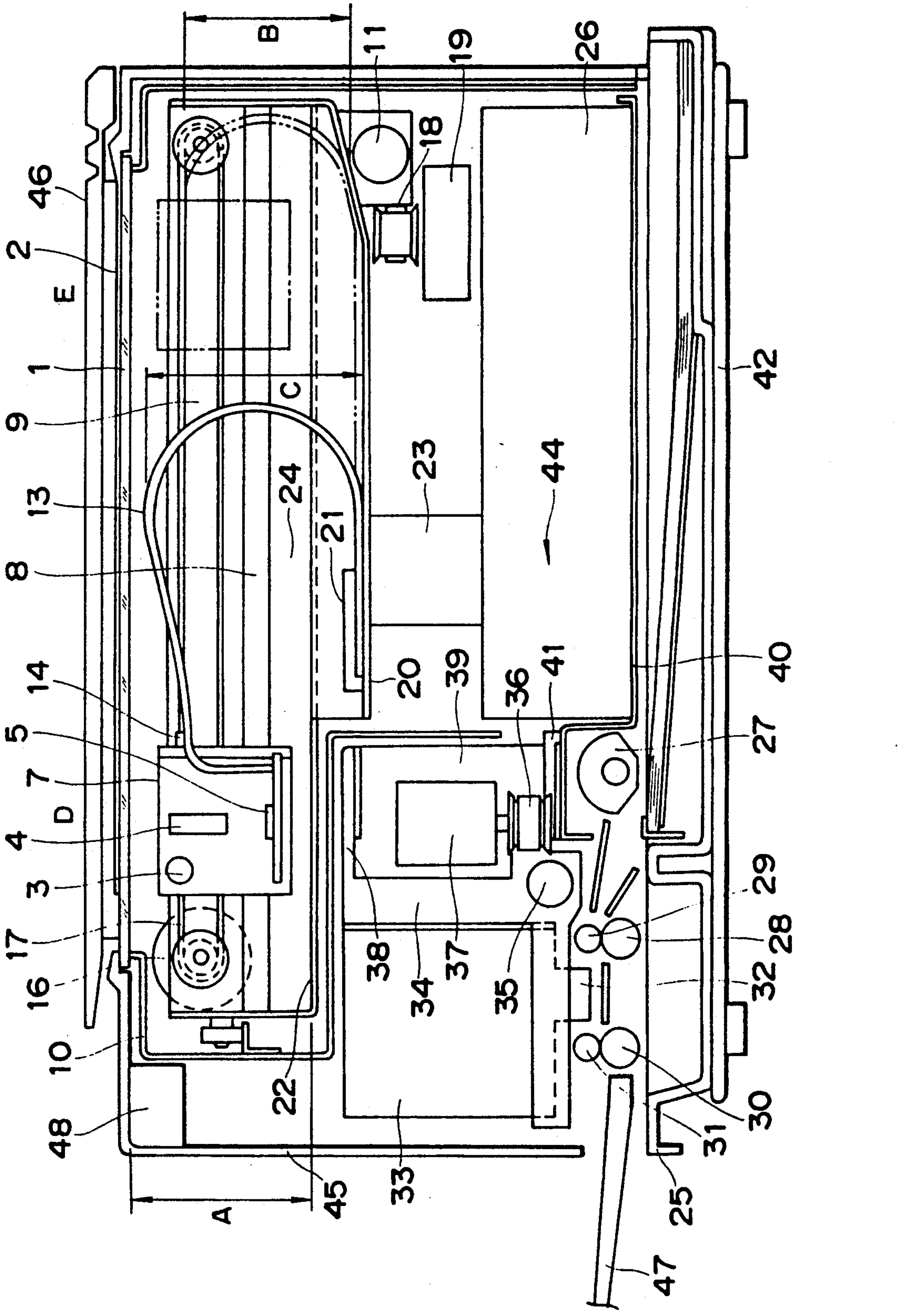
FIG. 1 is a cross-sectional view of a copying machine embodying the present invention.

FIG. 1 is a cross-sectional view of a color copying apparatus utilizing an ink jet recording system embodying the present invention.

Said color copying apparatus is composed of a unit for image reading and image processing (hereinafter called a reader unit 24) and a printer unit 44. The reader unit 24 reads an image by scanning an original 2 placed on an original supporting glass 1 with a CCD line sensor 5 provided with color filters of three color components R, G, B (see FIG. 2) and supplies the image information through an image processing circuit to the printer unit 44, which records an image on a recording sheet with a 4-color ink jet recording head of cyan (C), magenta (M), yellow (Y) and black (Bk).

In the following explained are the details of function.

The reader unit 24 is composed of components 1–23, and the printer unit 44 is composed of components 25–43. In the illustrated configuration, the front side of the apparatus is positioned at the upper left side in FIG. 1.

The printer unit 44 is equipped with an ink jet recording head 32 for recording an image by ink droplet discharge. Said recording head is provided, for example, with 128 nozzles arranged with a pitch of 63.5 microns in the vertical direction (sub scanning direction to be explained later), thereby capable of recording a width of 8.128 mm at a time. Thus, in recording on a recording sheet, there are repeated operations of recording an image with a width of 8.128 mm and advancing the recording sheet by 8.128 mm. In the following description, the direction of recording by said recording head is called main scanning direction, and the perpendicular direction of sheet advancement is called sub scanning direction. In FIG. 1, the main scanning direction is perpendicular to the plane of drawing, while the sub scanning direction is the horizontal or lateral direction along said plane of drawing.

The reader unit 24 repeats the reading of the original 2 by a width of 8.128 mm and the direction of said image reading is called main scanning direction, and the direction of movement for next reading is called sub scanning direction. In the illustrated configuration, the main scanning direction corresponds to the lateral direction in FIG. 1, while the sub scanning direction is perpendicular to the plane of FIG. 1.

The reader unit 24 functions in the following manner.

The original 2 placed on the original supporting glass 1 is illuminated by a lamp 3 in a main scanning carriage 7, and the reflected light is guided, through a lens array 4, to a photosensor (CCD line sensor) 5. The main scanning carriage 7 is slidably fitted on a main scanning rail 8 on a sub scanning unit 9. The main scanning carriage 7 is connected, by an unrepresented engaging member, to a main scanning belt 17, and effects a main scanning motion in the lateral direction in FIG. 1, by the rotation of a main scanning motor 16.

The sub scanning unit 9 is slidably fitted on a sub scanning rail 11 fixed on an optical frame 10, and is rendered slidable along said rail. Also the sub scanning unit 9 is connected, by an unrepresented engaging member, to a sub scanning belt 18 and moves perpendicularly to the plane of FIG. 1 by the rotation of a sub scanning motor 19, thereby effecting a sub scanning motion.

The image signal read by the CCD 5 is transmitted, through a looped signal cable 13, to the sub scanning unit 9. An end of said signal cable 13 is pinched, on the main scanning carriage 7, by a pinching member 14, while the other end is fixed on a bottom face 20 of the sub scanning unit by a member 21 and is combined with a sub scanning signal cable 23 which connects the sub scanning unit 9 and an electric unit 26 of the printer unit 44. The signal cable 13 follows the movement of the main scanning carriage 9, while the sub scanning signal cable 23 follows the movement of the sub scanning unit 9.

The printer unit 44 functions in the following manner.

The recording sheet, forwarded one by one from a sheet cassette 25, by means of a sheet feeding roller 27 driven by an unrepresented power source, is subjected to image recording by the recording head 32, in a position between two pairs of rollers 28, 29 and 30, 31. The recording head 32 is integrally constructed with an ink tank 33, and is detachably loaded on a printer main scanning carriage 34, which is slidably fitted on a printer main scanning rail 35.

The printer main scanning carriage 34 is connected to a main scanning belt 36 by an unrepresented engaging member, and effects a main scanning motion perpendicularly to the plane of FIG. 1, by the rotation of a main scanning motor 37.

The printer main scanning carriage 34 is provided with an arm 38, which supports a printer signal cable 39 for transmitting signals to the recording head 32. The other end of said cable 39 is fixed on a printer middle plate 40 by a member 41, and is further coupled with the electronic unit 26. Said printer signal cable 39 is so constructed as to follow the movement of the printer main scanning carriage 34, without touching the optical frame 10 positioned above.

The sub scanning in the printer unit 44 is achieved by advancing the recording sheet by 8.128 mm at a time, by rotating the rollers 28, 29, 30, 31 by an unrepresented power source. There are also shown a bottom plate 42, an external plate 45, an original pressure plate 46, a sheet discharge tray 47, and an electric unit for an operation panel.

Figure 2:
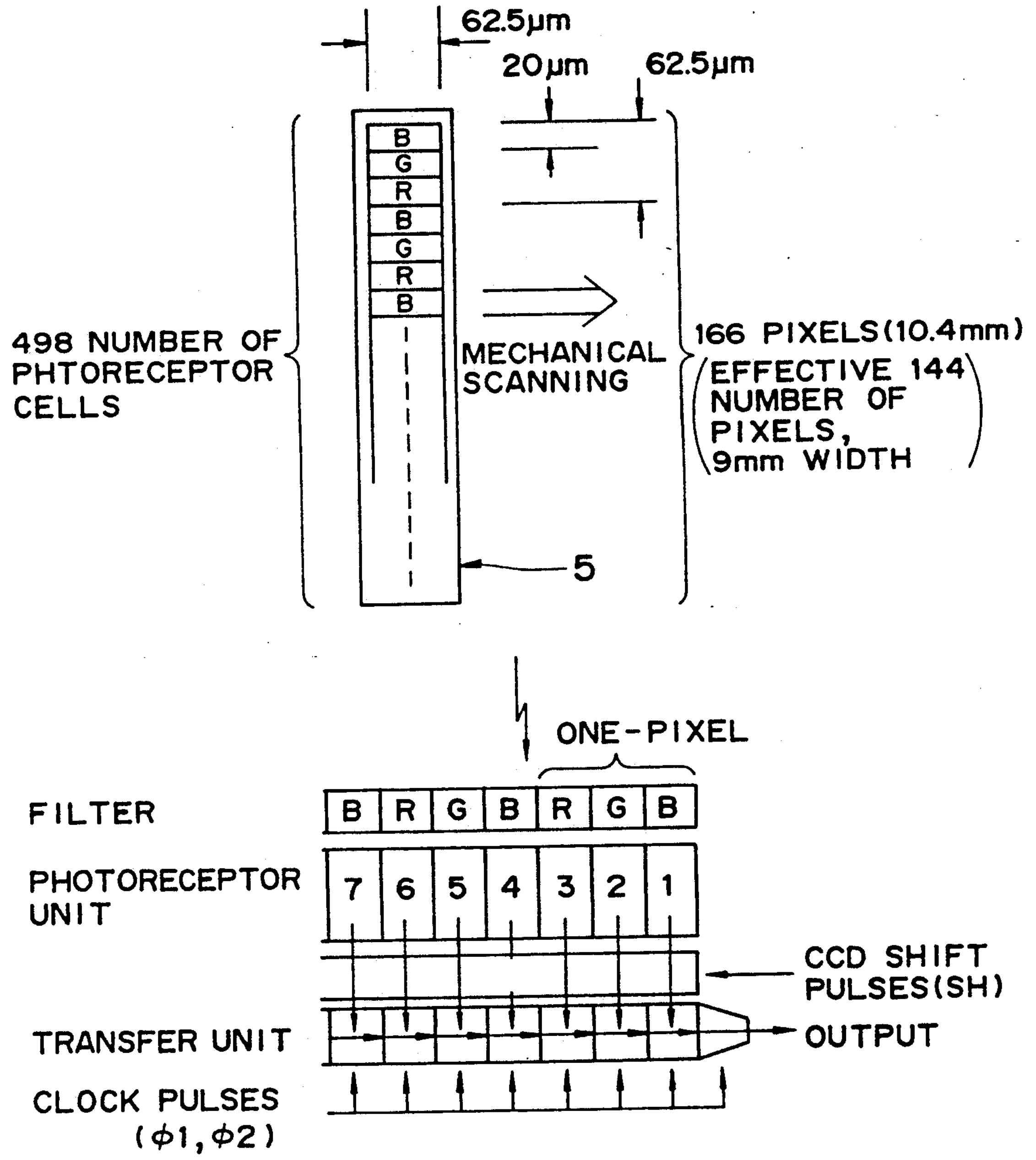
FIG. 2 is a schematic view of a CCD line sensor employed in said embodiment.

FIG. 2 shows the details of the CCD line sensor 5 employed in the present embodiment. Said line sensor 5 is provided with 498 photosensor cells arranged linearly, and reads 166 pixels since a pixel is composed of three pixels of R, G and B. Among these, there are contained 144 effective pixels, with a width of about 9 mm.

Figure 3A:
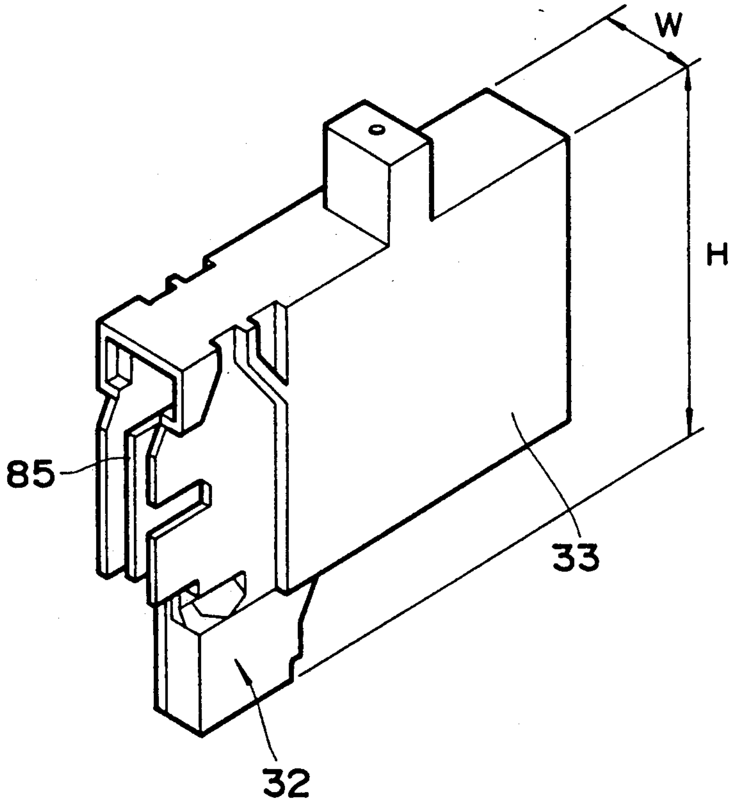
FIG. 3A is an external view of an ink jet recording head employed in said embodiment.
Figure 3B:
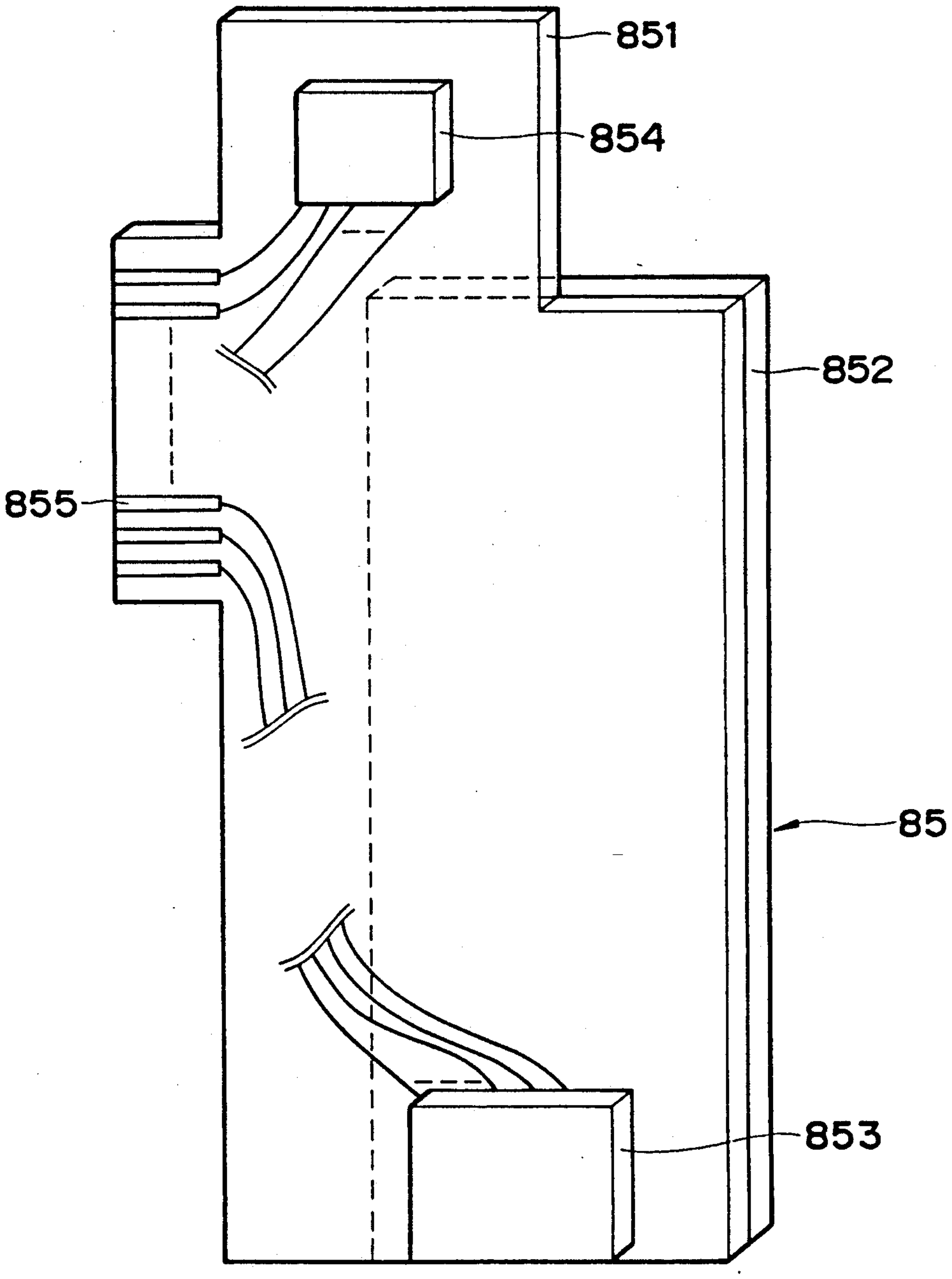
FIG. 3B is a schematic view of a substrate for said ink jet recording head employed in said embodiment.

FIG. 3A is an external view of an ink jet cartridge employed in the printer unit 44 of the color copying apparatus of the present embodiment, and FIG. 3B is a view showing the details of a printed circuit board 85 shown in FIG. 3A.

In FIG. 3B, there are shown a printed circuit board 851, a heat-radiating aluminum plate 852, a heater board 853 including heat generating elements and a diode matrix, an EEPROM (non-volatile memory) storing in advance information on unevenness in density, and contact electrodes 855 constituting a connector with a main body. A linear array of ink discharge openings (orifices or nozzles) is not illustrated.

As explained above, the printed circuit board 851 including the heat generating elements of the recording head 32 and the control unit therefor is equipped with an EEPROM 854 memorizing the density unevenness information specific to each recording head. The unevenness in density in each recording head is measured at the production thereof, and the density unevenness data or the data for correcting the density unevenness, corresponding to thus measured data, are stored, in said EEPROM 854, for respective ink discharge openings or for respective groups each including a certain number of such openings.

Thus, when the recording head 32 is mounted, the main body reads the information on the density unevenness from said head 32, and executes a predetermined control for reducing said density unevenness, based on said information. In this manner satisfactory image quality can be secured.

Figure 4A:
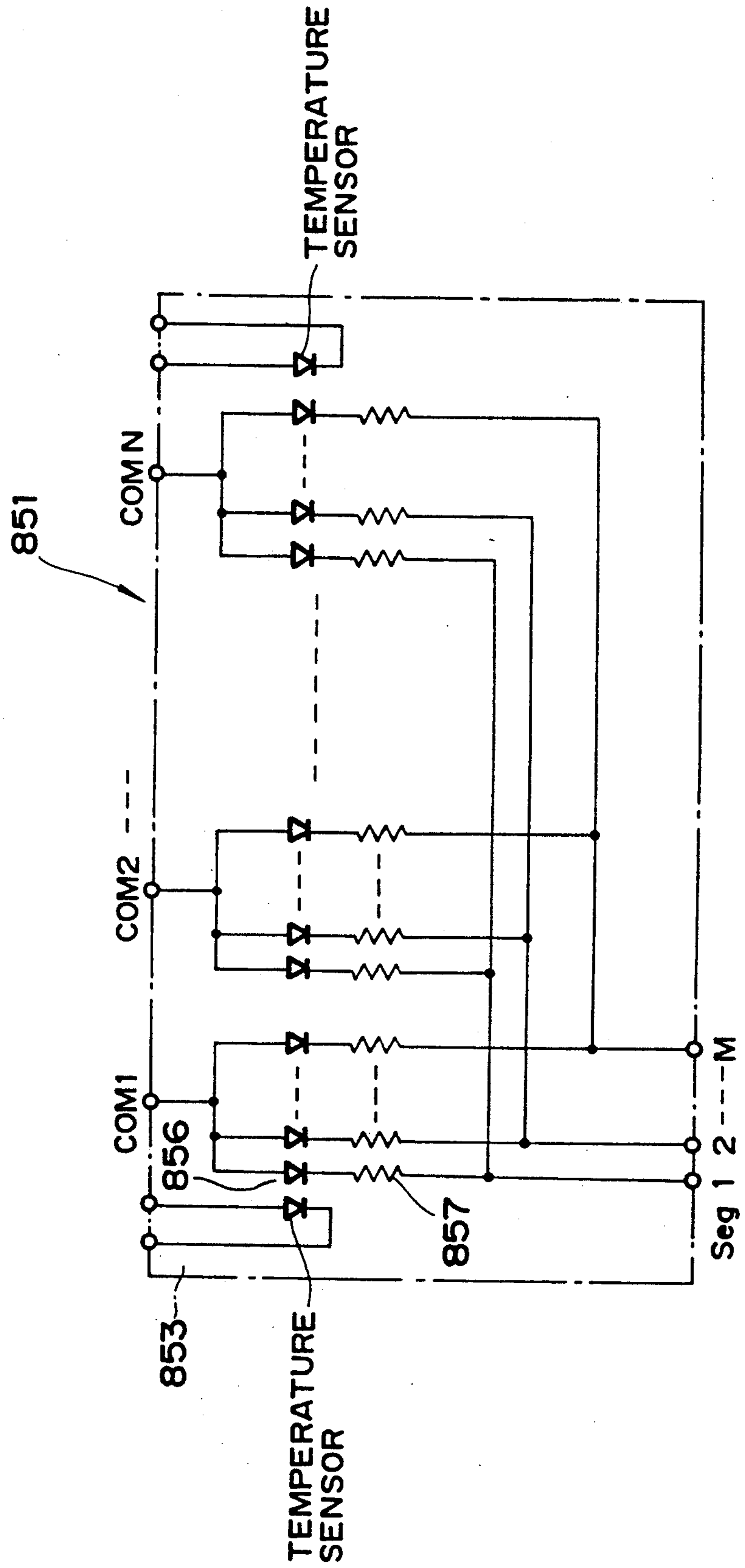
FIG. 4A is a circuit diagram of a heater board for said ink jet recording head employed in said embodiment.
Figure 5:
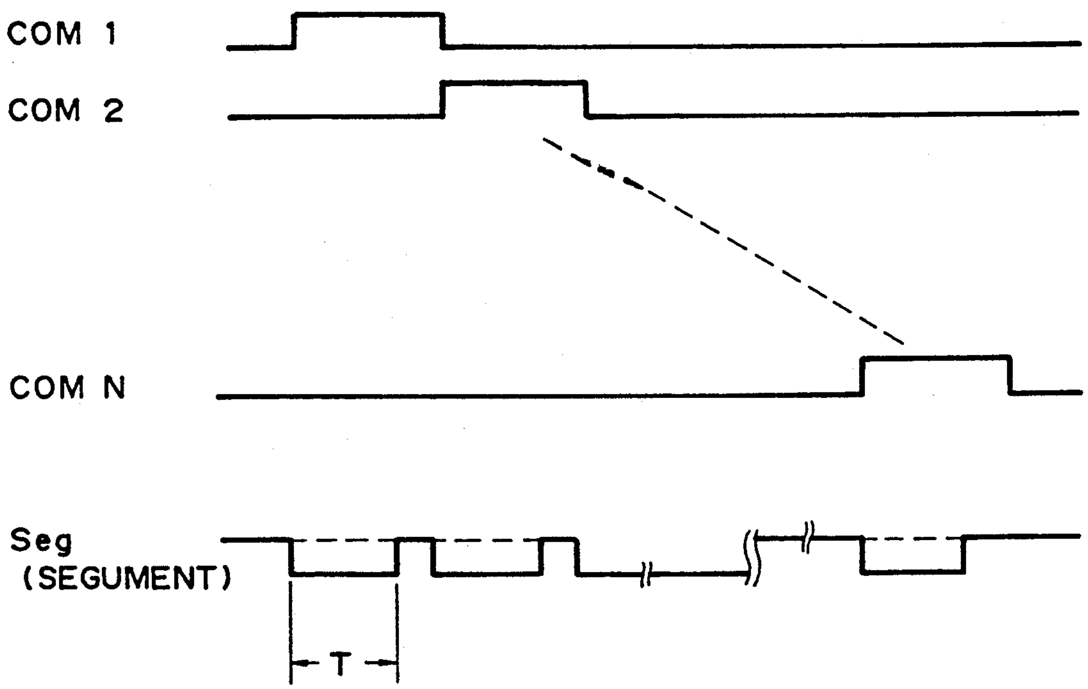
FIG. 5 is a timing chart showing drive signals for the circuit of said heater board.

FIG. 4A shows a principal part of the circuit structure on the printed circuit board 851 in FIG. 3B. A chain-lined frame indicates the circuits in the heater board 853, including serial connections of heat generating elements 857 and diodes 856 for preventing current leakage, arranged in an N×M matrix. The heat generating elements 857 are activated in units of block on a time division basis as shown in FIG. 5, and the driving energy therefor is controlled by the duration T of a pulse applied to segment terminals.

Figure 4B:
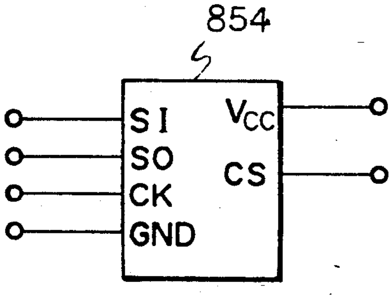
FIG. 4B is a block diagram of an EEPROM mounted in the recording head of said embodiment.

FIG. 4B shows an example of the EEPROM 854 shown in FIG. 3B and storing the information on the density unevenness. Said information is supplied to the main body by serial communication, in response to a request (address) signal DI entered to a port SI.

Figure 4C:
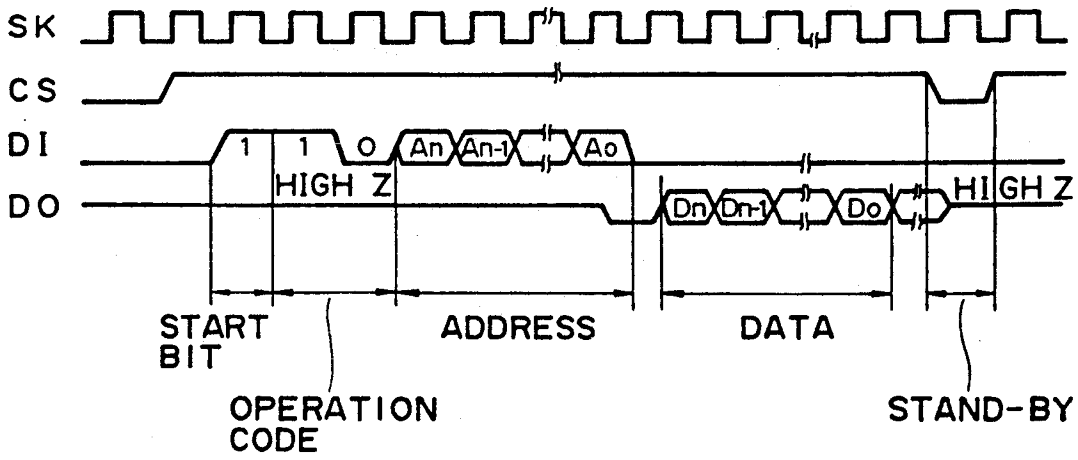
FIG. 4C is a time chart showing a mode of the information exchange.

The mode of said information exchange is shown in FIG. 4C. In synchronization with clock signals SK density unevenness information D0 in the unit of 8 bits are released from a serial port SO.

For facilitating the understanding of the present embodiment, there will at first be given an explanation on the basic concept of formation of unevenness in the density.

Figure 6A:
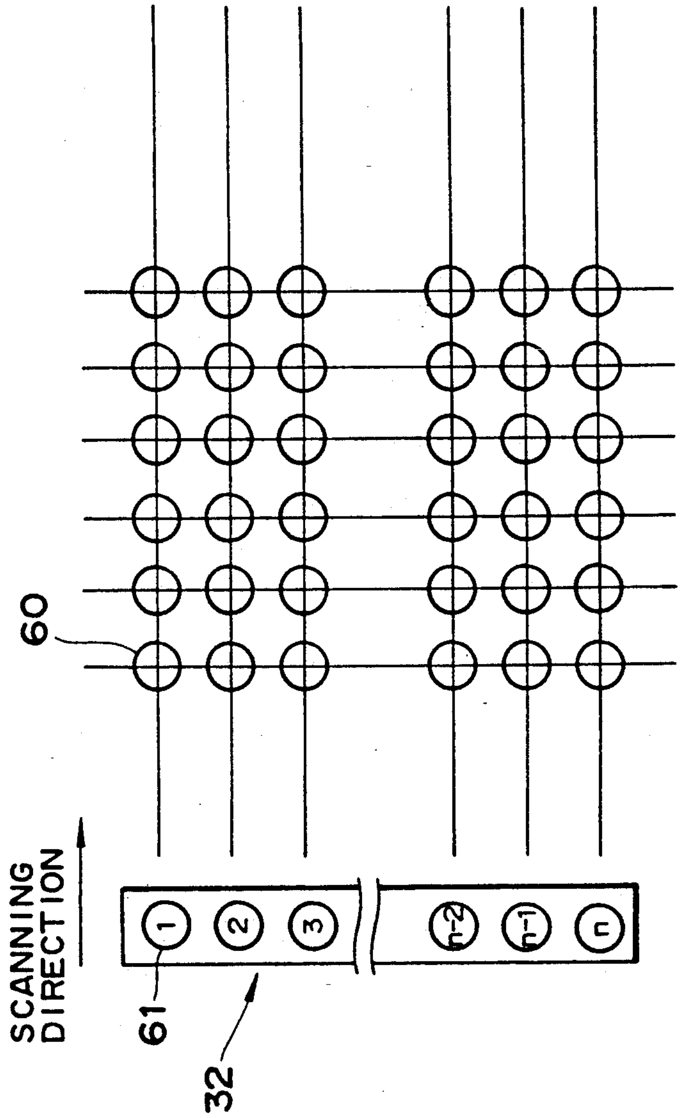
FIG. 6A is a schematic view showing an ideal relationship between discharge openings of the recording head and recorded dots.

FIG. 6A is a magnified view of a record obtained with an ideal recording head 32, provided with ink discharge openings (nozzles) 61. Recording with said head 32 provides, on the recording sheet, regularly aligned ink spots 60 with a uniform droplet diameter. FIG. 6A shows a state in which all the nozzles are activated, but there will be no unevenness in the density in a halftone recording, for example with a 50% activation.

Figure 6B:
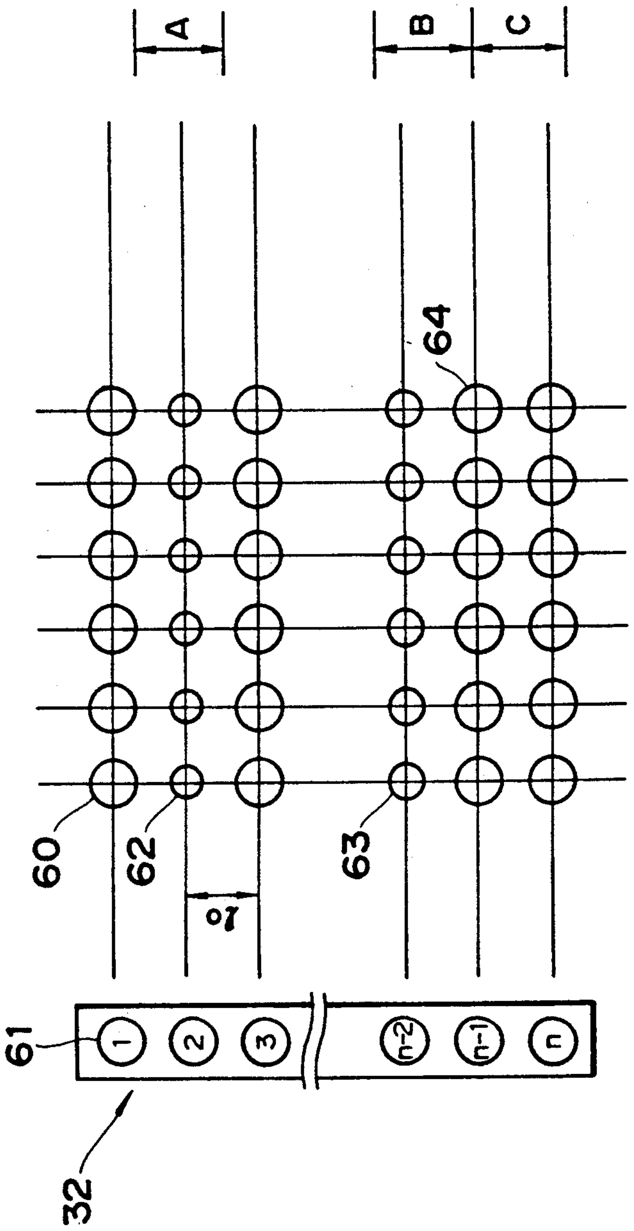
FIG. 6B is a schematic view showing an actual relationship between discharge openings of the recording head and recorded dots.

On the other hand, in a case shown in FIG. 6B, the diameter of droplets 62, 63 from the 2nd and (n−2)-th nozzles is smaller than the average, and the spots formed by the (n−1)-th and (n−1)-th nozzles are aberrated from the central position. More specifically, the spots 63 from the (n−2)-th nozzle are aberrated to upper right from the center, and the spots from the (n−1)-th nozzle are aberrated to lower left from the center.

As a result, an area A in FIG. 6B appears as a streak lower in density, and also an area B appears as a streak lower in density because the distance between the (n−2)-th and (n−1)-th spots is larger than the average distance $l_0$ of the spots. On the other hand, an area C appears as a streak higher in density because the distance between the (n−1)-th and n-th spots is smaller than said average distance $l_0$.

As explained in the foregoing, the unevenness in density principally results from fluctuation in droplet diameter and from aberration in spot position from the central position.

In the following there will be explained a method for correcting the fluctuation in droplet diameter, which is one of the causes of density unevenness.

Figure 7:
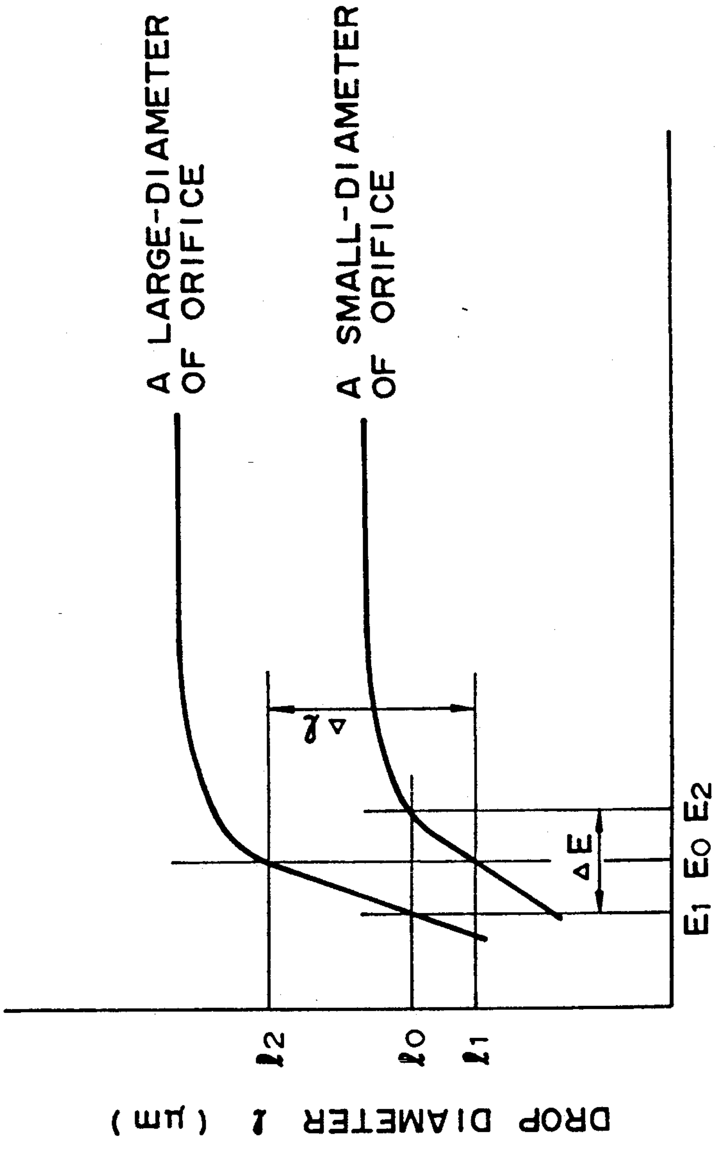
FIG. 7 is a chart showing the relationship between a driving energy applied to the heat generating element of the recording head for ink discharge and the diameter of discharged ink droplet.

FIG. 7 shows the relationship between the driving energy applied to the heat generating element 853 provided at the discharge opening of the recording head 32, for inducing ink discharge, and the obtained ink droplet diameter. As will be understood from the characteristic curve in FIG. 7, the droplet diameter becomes larger with the increase of driving energy within a certain range of driving energy, but thereafter becomes almost saturated. However it will be apparent that nozzles of larger and smaller diameters provide significantly different droplet diameters for a same driving energy.

Thus, it will be understood that, in order to obtain a uniform droplet diameter from the nozzles of difference sizes, for example for obtaining a same droplet size $l_0$, driving energies $E_2$ and $E_1$ ($E_2>E_1$) should be used respectively in the large and smaller nozzles. Therefore, at least the unevenness in density resulting from the difference in the droplet diameter from different nozzles can be eliminated by determining a suitable driving energy for each nozzle corresponding to the actual droplet diameter therefrom, and storing the value of said driving energy or the identifying information corresponding to said driving energy in the non-volatile memory (EEPROM) shown in FIG. 3B.

Also, in case the variable control of driving energy for each nozzle is not possible because of the magnitude of circuitry in the main body, and if the recording head 32 is designed for matrix drive as shown in FIG. 4A, there may by employed density control in the unit of blocks, with simplified circuitry. by determining the average droplet diameter for the nozzles of a block as a minimum unit (in FIG. 4A, the minimum unit is composed of nozzles connected to the common terminals COM1–COMN) and storing a driving energy corresponding to said average value in the non-volatile memory 854 as explained before. For controlling the unevenness in temperature, two temperature sensors are provided as shown in FIG. 4A.

The above-mentioned information for identifying the driving energy can be, for example, the duration of control pulse, driving voltage or driving current.

In the following there will be explained measure for compensating the positional aberration of spot from the central position, which is another cause of the unevenness in density.

Said aberration basically results from a deviation in the ink discharge direction from the nozzle, because of limitation in the precision of nozzle formation, and such deviation is practically impossible to correct. A practical method for correcting the unevenness in density, resulting from such positional aberration of spots, is not to distinguish such unevenness caused by the positional aberration from that caused by the droplet diameter mentioned above, but is to measure the image density in a certain area recorded by the recording head, at the manufacture thereof, to store control data based on the measured value in the non-volatile memory 854 and to control the amount of ink deposition in said area according to said data.

Figure 8A:
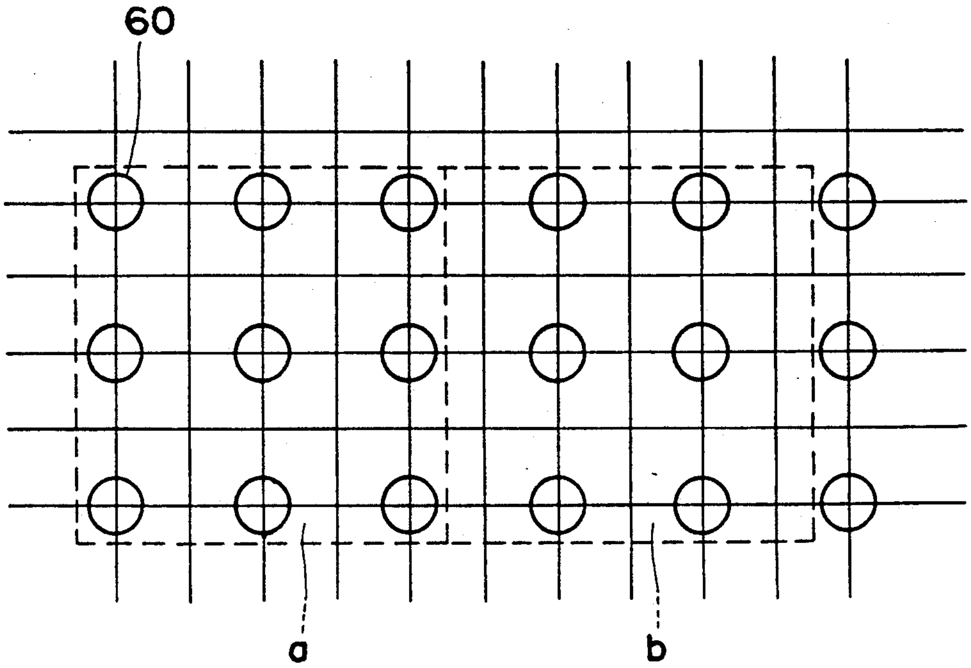
FIG. 8A is a schematic view showing a 50% halftone recording with an ideal recording head.
Figure 8B:
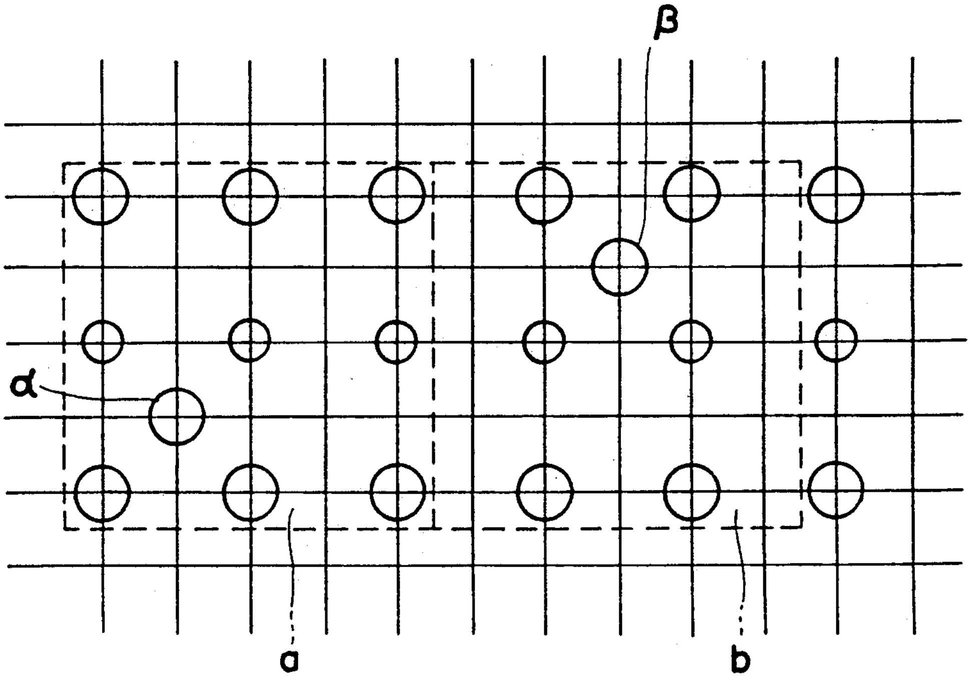
FIG. 8B is a schematic view showing a halftone recording, with density correction, with an actual recording head.

As an example, FIG. 8A shows a halftone recording of 50% density with an ideal recording head. If such recording is conducted with a recording head, involving fluctuations in droplet diameter and positional aberrations of spots as shown in FIG. 8B, the correction of unevenness in density can be achieved in the following manner. The total dot area in an area a defined by a broken-lined frame in FIG. 8B is brought close to that in a corresponding area a in FIG. 8A, whereby the recording with the recording head of the characteristic shown in FIG. 8B is felt, to the human eyes, equivalent in density to the recording in FIG. 8A.

The density unevenness is practically resolved by effecting a similar correction also in the area b in FIG. 8B. Such density correction control is conducted in the image processing by the reader unit 24, as will be explained in the following.

FIG. 8B illustrates the result of density correction control in a simplified manner, for facilitating the understanding, and $\alpha$ and $\beta$ are dots for correction. Also for binary digitization of an image to be explained later, there are already known various methods such as dither method, error diffusion method, density average method etc. The details of these methods will not be explained, however, since they are not the essential component of the present invention.

Figure 9:
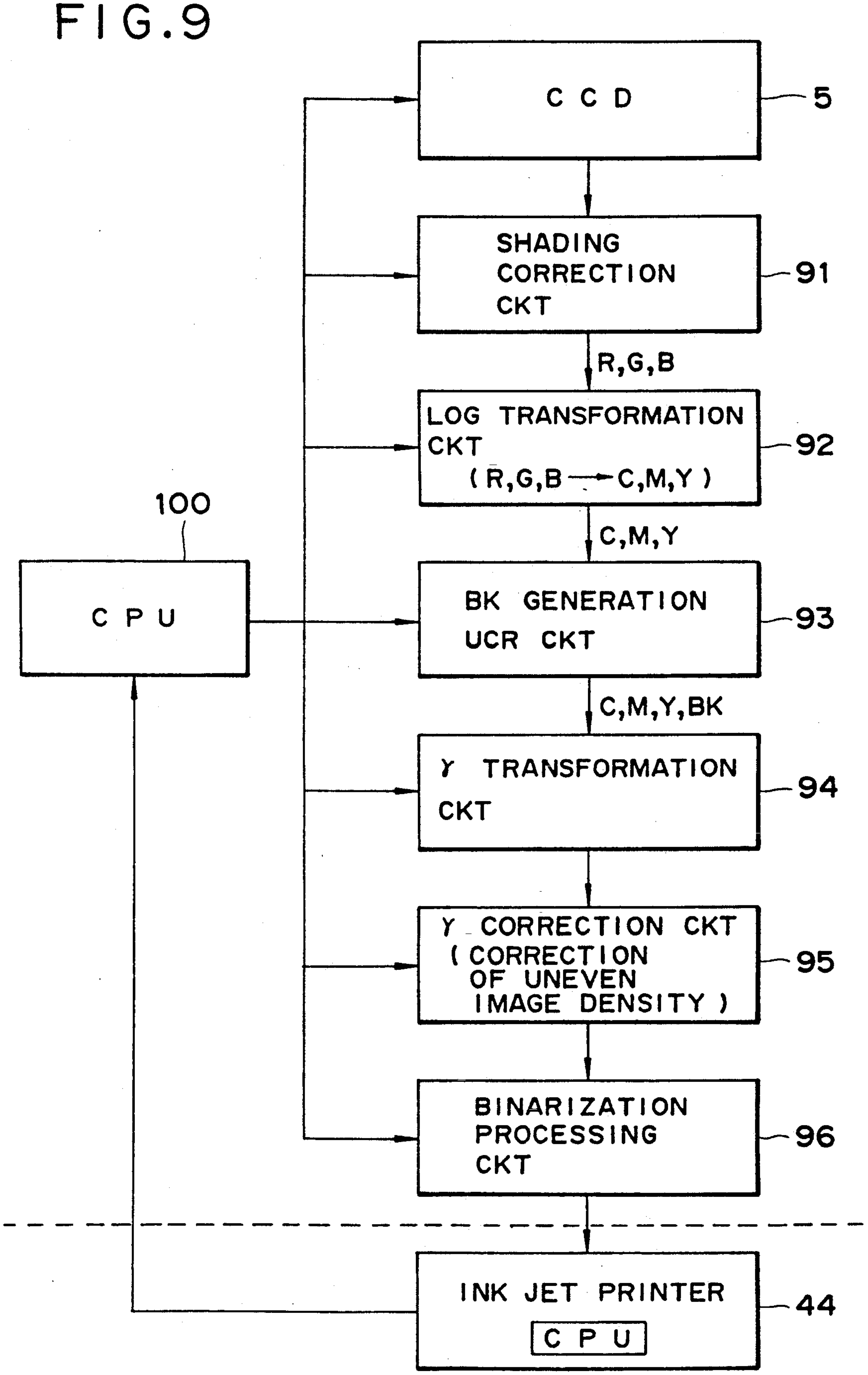
FIG. 9 is a block diagram of an image processing circuit employed in said embodiment.

The density correction in the present embodiment can be executed, for example, as $\gamma$ correction control, in the flow of signal processing in the reader unit 24 as shown in FIG. 9. Referring to FIG. 9, image signal obtained from the CCD sensor 5 is subjected to a correction for the sensitivity of said sensor in a shading correction circuit 91, and is converted, in a log transformation circuit 92, from three light primary colors (red, green and blue) into three printing primary colors (cyan, magenta and yellow). The obtained C, M and Y color signals are subjected, in an undercolor removal (UCR) circuit 93 for black signal generation, to the extraction of a common component generated by the mixing of cyan (C), magenta (M) and yellow (Y) or a part of said common component as the black (Bk) component. The C, M, Y and Bk signals thus obtained are then supplied to a $\gamma$ transformation circuit 94.

Figure 10:
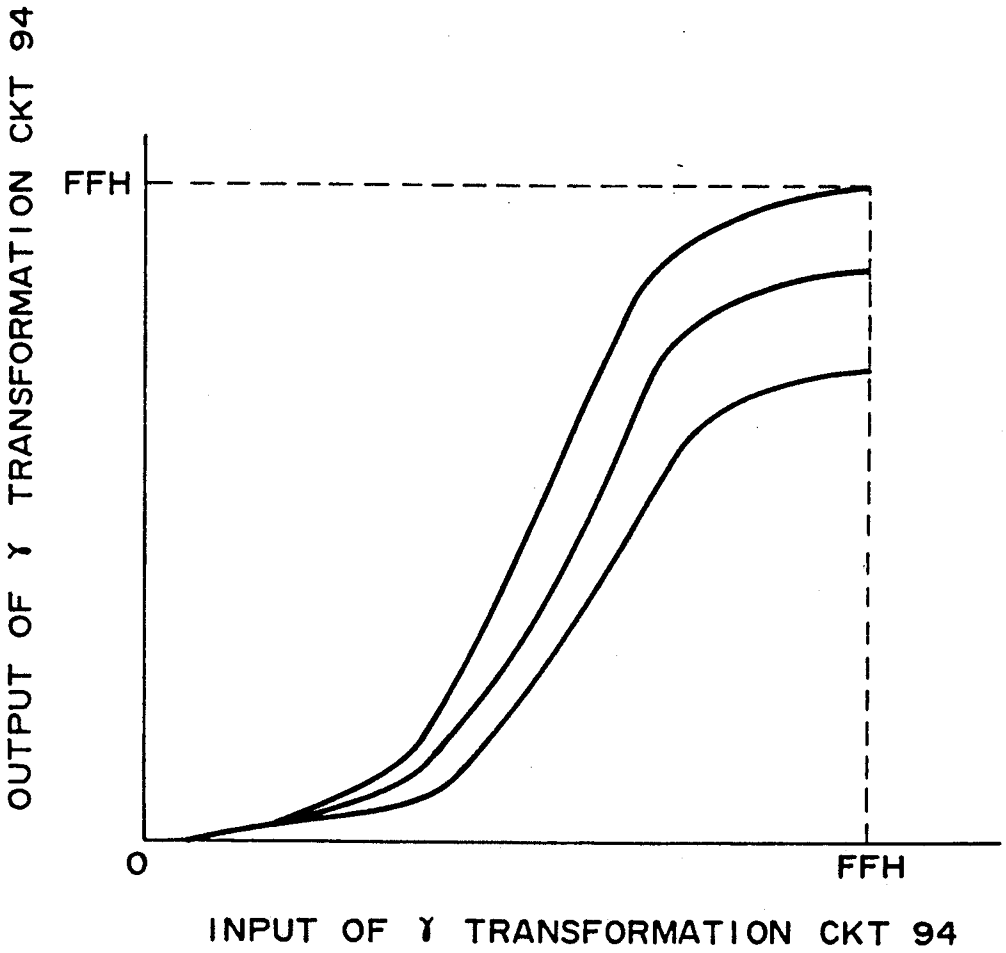
FIG. 10 is a chart showing the relationship between input and output signals in a gamma transformation circuit shown in FIG. 9.

Said $\gamma$ transformation circuit 94 generally contains several functions for calculating output data from input data as shown in FIG. 10, and a suitable function is selected according to the density balance of the colors the taste of the user. These functions are determined according to the characteristics of the inks to be used and of the recording sheet.

Figure 11:
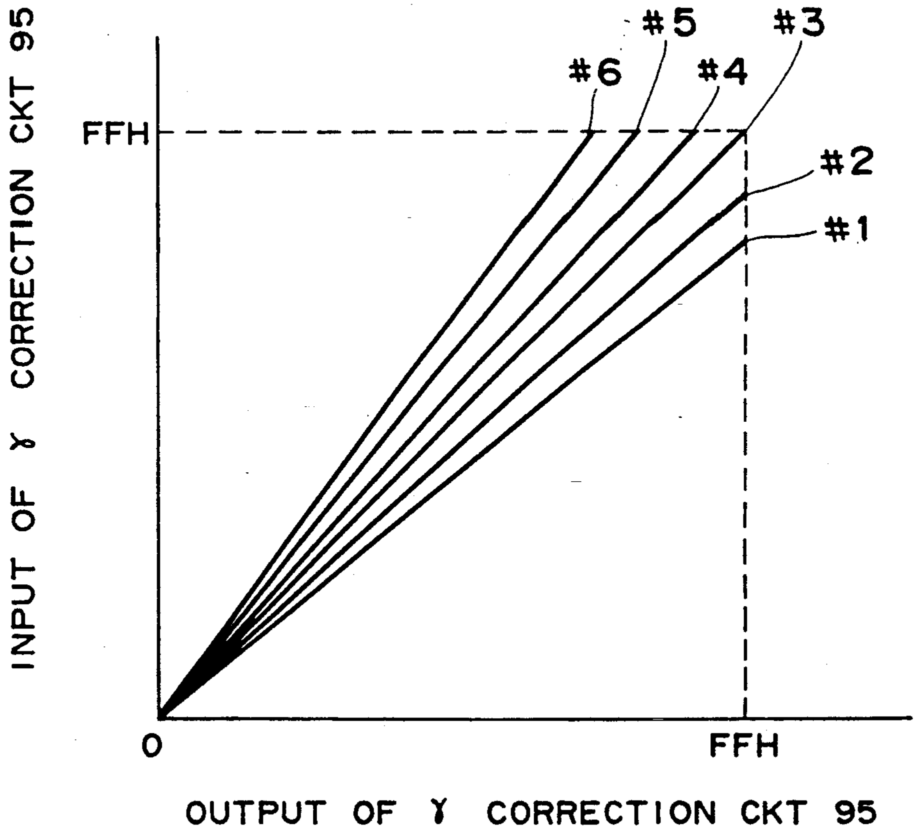
FIG. 11 is a chart showing the relationship between input and output signals in a gamma correction circuit shown in FIG. 9.

A $\gamma$ correction circuit 95, receiving the output signal of the $\gamma$ transformation circuit 94, has various correction functions as shown in FIG. 11. For example, a function #3 is a straight line with an inclination of 45°, whereby the input signal is directly released as the output signal without change. Functions #1 and #2 multiply the input signal with constants smaller than unity. Said functions #1 and #2, when applied to a high-density portion of the recording head 32, correct the input image data to densities lower than the actual value.

On the other hand, functions #4–#6 correct the input image darker by multiplying the input data with constants larger than unity. These functions are therefore effective for a low-density portion of the recording head 32.

In the present embodiment, therefore, one of the plural functions shown in FIG. 11 (in practice there are prepared a larger number of functions) is selected for each of the nozzles of the recording head 32. In the non-volatile memory 854 shown in FIG. 3A, there are memorized identification numbers of the correction functions as shown in FIG. 11, respectively corresponding to the nozzles. The image signal is subjected to the $\gamma$ correction in the correction circuit 95 for each nozzle, by referring to said identification number, and the corrected result is sent to a binary digitizing circuit 96 shown in FIG. 9. Said circuit 96 converts the multivalue information of each pixel (8 bits in FIG. 11) eventually into a binary signal "1" or "0", according to the dither method, error diffusion method or density average method mentioned above. The present embodiment employs the error diffusion method as an example, whereby a binary output as shown in FIG. 8B can be obtained in the printer unit 44.

There are further provided a central processing unit (CPU) 100 for controlling various parts of the reader unit; and a central processing unit (CPU) 200 for controlling various parts of the printer unit, each provided with already known ROM, RAM etc.

Figure 12:
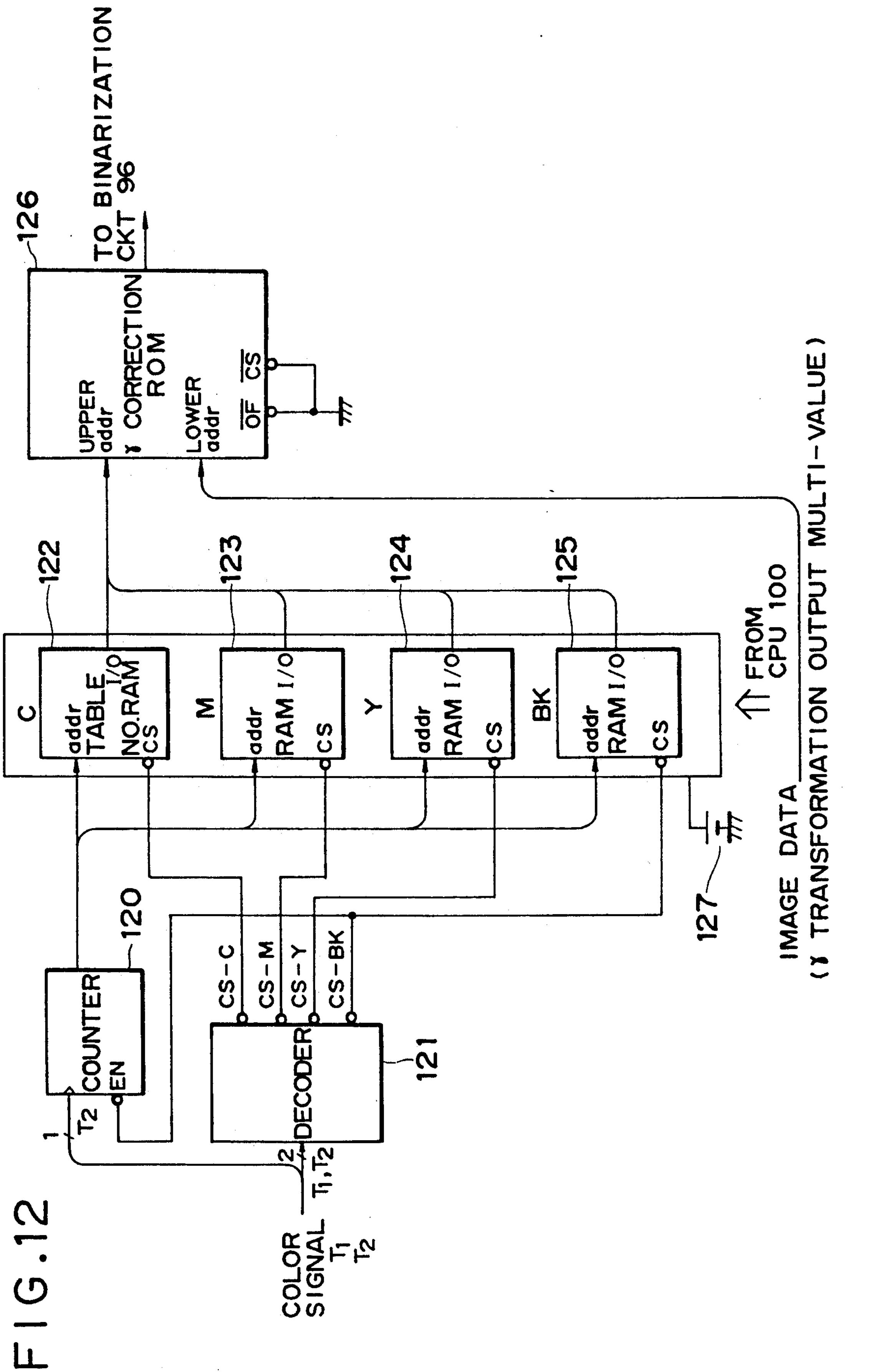
FIG. 12 is a block diagram showing an example of circuit structure of said gamma correction circuit.

FIG. 12 is a block diagram showing the detailed structure of the $\gamma$ correction circuit 95 shown in FIG. 9.

A counter 120 and a decoder 121 select one of RAM's 122–125 according to color signals T1, T2. Said RAM's 122–125 respectively store color transformation data corresponding to different colors. A $\gamma$ correction ROM (read-only memory) 126 stores a conversion table for $\gamma$ correction.

The $\gamma$ transformation circuit 94 provides 2-bit color signals T1, T2 which assume one of combinations 00, 01, 10 and 11, respectively corresponding to C, M, Y and Bk, for identifying the color of the image data. The counter 120, receiving the lower bit T2 of said 2-bit color signals, effects an upcount at the upshift of the signal T2 when the decoder 121 releases a CS-BK signal. Thus the counter 120 effects an upcount at the start of the C signal. Since a pixel is composed of a set of C, M, Y and Bk, the content of said counter 120 is stepwise increased for each pixel. The output of said counter 120 is supplied to address input ports of four RAM's 122–125.

The content of the non-volatile memory 854 in each recording head is read by the CPU 200 in the printer unit 44, transferred through the CPU 100 of the reader unit and stored, in advance in said RAM's 122–125. The output of the decoder 121 designates the addresses of the RAM's 122–125 in succession, in synchronization with the color signals T1, T2, and the accessed content of the RAM is selectively released as an upper address for the $\gamma$ correction ROM 126.

The output of the counter 120 indicates the serial nozzle number of the recording head 32 corresponding to the image data, and the identification number of a $\gamma$ correction curve corresponding to the nozzle is memorized in an area, in each of the RAM's 122–125, addressed by said nozzle number. Thus the $\gamma$ correction ROM 126 identifies the table number by the above-mentioned upper address, also fetches the image data from the $\gamma$ transformation circuit 94 as the lower address and corrects said image data according to the selected correction function, for supply to the binary digitizing circuit 96.

The above-explained embodiment provides a copying apparatus consisting of an image reading apparatus and an ink jet recording apparatus, in which the density correction is conducted in said image reading apparatus, but the present invention is not limited to such embodiment but is likewise applicable, for example, to an ink jet recording apparatus receiving R, G and B signals from a color VCR or the like, or to a facsimile apparatus. In these cases the gamma correction circuit 95 for correcting the density unevenness is provided in a signal processing system in the ink jet recording apparatus.

In the following there will be given an explanation on the data in the EEPROM provided in the recording head of the foregoing embodiment.

Figure 13:
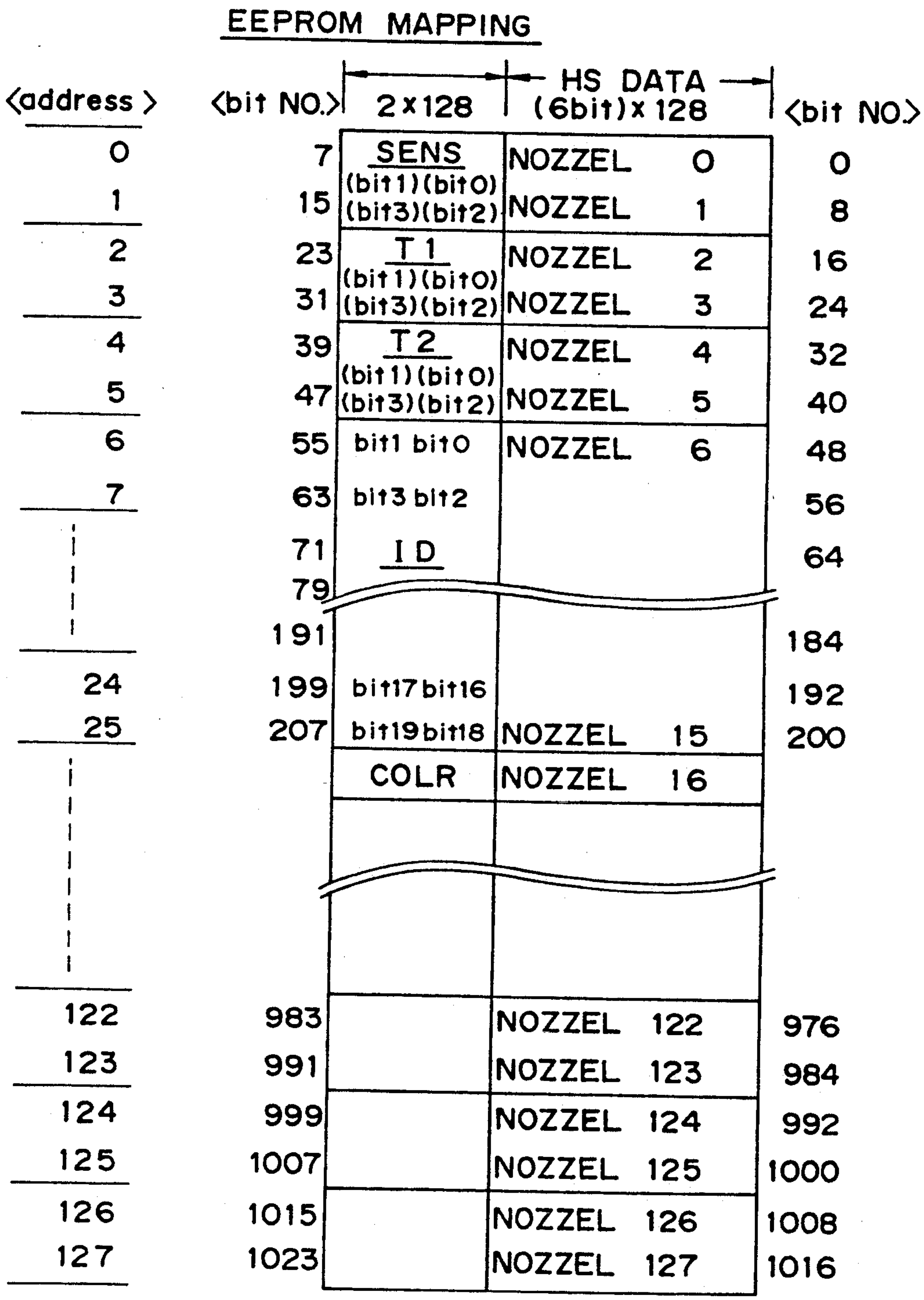
FIG. 13 is a view showing data format in a nonvolatile memory.

FIG. 13 is a data map in the EEPROM provided in the recording head of each color. In the present embodiment, the EEPROM stores the manufacturing number, data for correcting unevenness in density, drive data for setting the driving conditions, and data indicating the ink color of the recording head.

Figure 17:
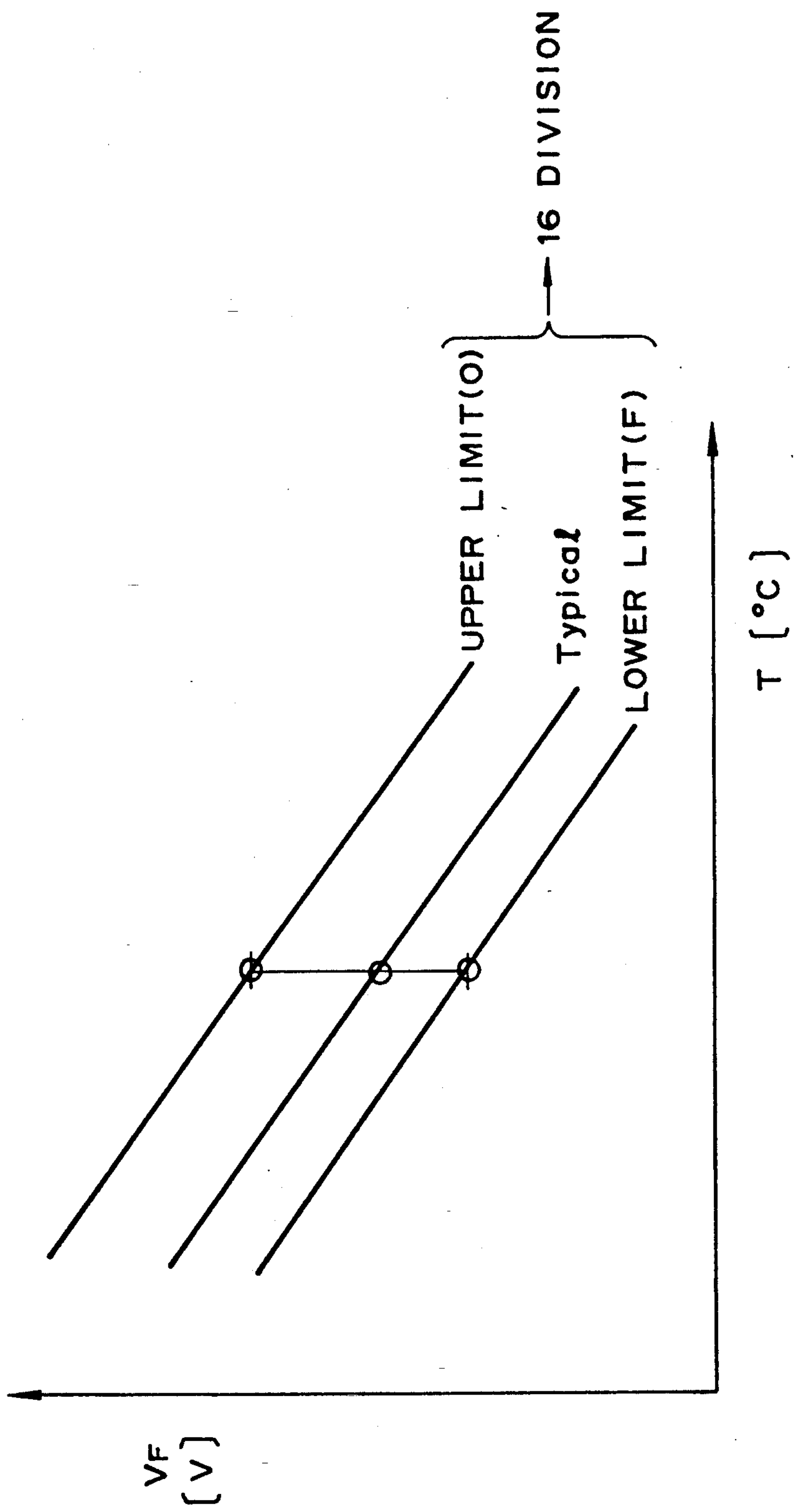
FIG. 17 is a chart showing temperature characteristic of a temperature sensor.

As shown in FIG. 13, each EEPROM in the present embodiment has a capacity of at least 1024 bits, and, among 8 bits from 0th to 7th bits in each address, the 0th to 6th bits are assigned for the correction data for each nozzle. In the 6th and 7th bits at the addresses "0" and "1", there assigned 4-bit information SENSE, indicating the characteristics of the temperature sensors provided in the recording head. In the present embodiment the temperature sensor is composed of a diode, having a relationship between the temperature and the voltage drop VF as shown in FIG. 17. In the present embodiment, the interval between the upper and lower limits is divided into 16 regions, to which data 0–F are respectively assigned, and one of said data is stored as the above-mentioned SENSE data. The 6th and 7th bits of the addresses "2" and "3" are assigned to the data T1, and the 6th and 7th bits of the addresses "4" and "5" are assigned to the data T2. Also the upper two bits of the addresses "6" to "25" are assigned to the identification data ID, and the upper two bits of the address "26" are assigned to the color data COLOR.

Figures 14A, 14B:
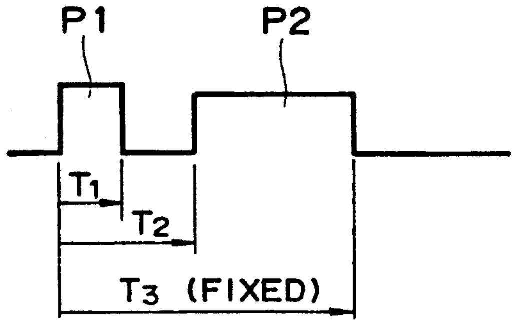
FIGS. 14A and 14B are views showing the functions of data symbols.

Said data T1, T2 indicate the optimum driving pulse forms, in which T1 indicates the duration of a preliminary pulse Pl for pre-heating the heater, prior to the heater activation for ink discharge, while T2 indicates the duration of a driving pulse P2 for causing ink discharge, as shown in FIG. 14B. The data ID indicates the manufacturing number of the head, and the data color indicates the ink color of the recording head.

In the present embodiment, since the data stored the non-volatile memory (EEPROM) are the key for maintaining high image quality, the obtained image quality is affected significantly if said data are destructed or partly varied by electrostatic charge, mechanical dropping or other unexpected accidents. Also in case of a detachable recording head, a head not matching the specification of the main body (for example the driving energy for the heaters of the nozzles) may be mounted. The recording operation with such recording head may result in deterioration of the image quality, and the operator can recognize the mounting of such unmatching head only after the start of recording operation. On the other hand, if such deterioration of image quality is not evident or overlooked, there may result an undesirable effect on the control system or on the recording head itself. Particularly in an ink jet recording apparatus employing electrothermal converters for the generation of ink discharge energy, there may result a dangerous situation since a large electric current is involved. For these reasons, it is necessary to identify whether the recording head is properly matching.

In consideration of the foregoing, in the present embodiment, the sum of the lower 6 bits in 1 byte data in each address (indicated as HS data in FIG. 13) is taken as check-sum data, and the lower 6 bits of said sum are stored, as effective data, in the upper 2 bits of the addresses "125"–"127". Also data P1 and P0 in the 6th and 7th bits in the address "124" are defined parity bits and are so determined that the parity in the 6th and 7th bits in all 128 addresses becomes even.

Figure 16:
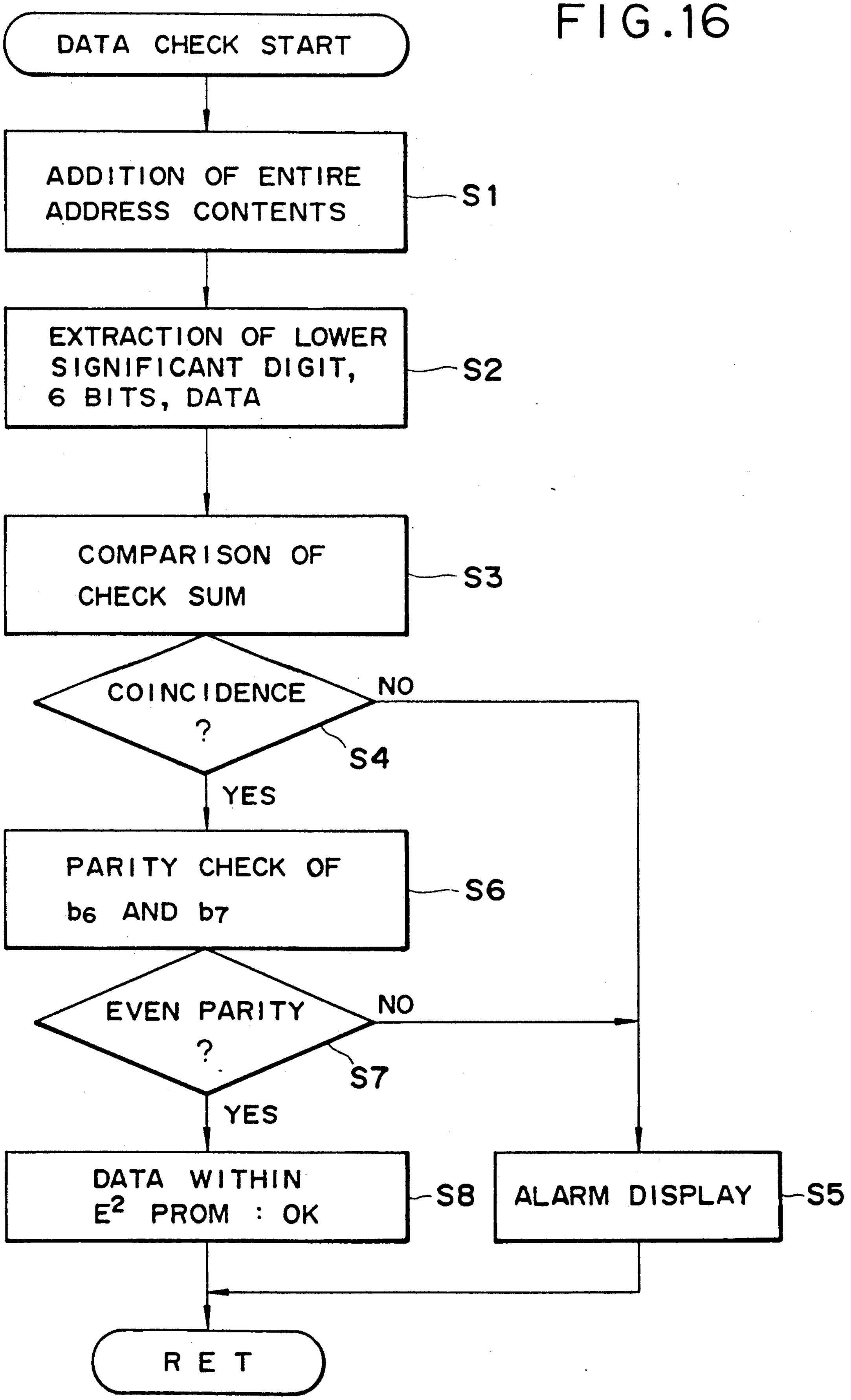
FIG. 16 is a flow chart showing a control sequence for data check function shown in FIG. 15.

In the present embodiment, the CPU checks these data at the start of power supply, according to a flow chart shown in FIG. 16.

At first a step S1 adds all the data at the addresses 0–127 in the EEPROM provided in the recording head, and a step S2 extracts the lower 6 bits of thus obtained sum. A next step S3 compares thus extracted 6-bit data with the upper 2-bit data of the addresses 125–127 (total 6 bits), and a step S4 discriminates whether both data mutually coincide. In case of non-coincidence, a step S5 executes an error process, for example activation of an unrepresented buzzer.

In case the step S4 identifies the coincidence, a step S6 executes parity check based on the upper 2 bits of the address 124. If a step S7 identifies that the parity is not even, the sequence proceeds to the step S5. On the other hand, if the parity is identified even, a step S8 identifies that the mounted recording head is normal or proper, and the sequence returns to a main process. Subsequently the gamma correction data for respective nozzles, read from the EEPROM, are transferred to the reader CPU 100, which stores said data in the RAM's 122–125.

A program corresponding to the above-explained flow chart is stored in a ROM belonging to the CPU 200 of the printer unit 44.

As explained in the foregoing, the present embodiment allows to confirm whether the data of the non-volatile memory in the recording head are proper, and to give a warning to the user by detecting, in advance, data that will accidentally deteriorate the image quality, thereby ensuring the reliability of the products.

Figure 15:
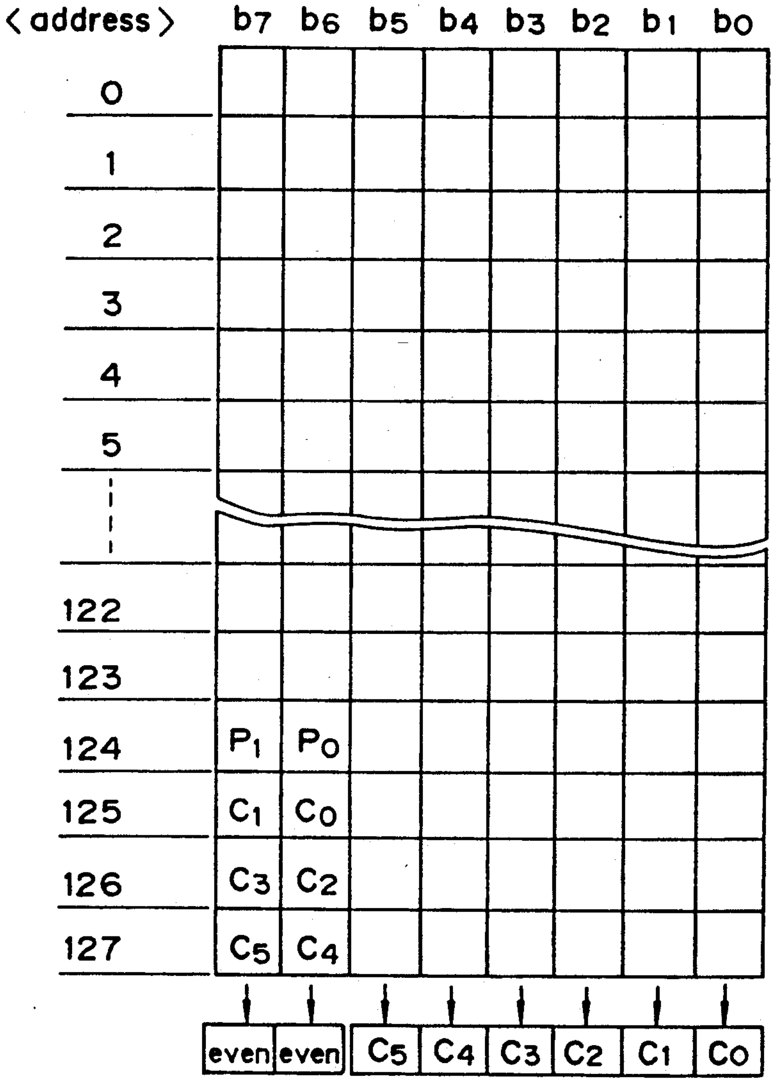
FIG. 15 is a view showing data check function in the non-volatile memory of said embodiment.

In the above-explained embodiment the sum of all the bytes is calculated at first as the check-sum data, but it is also conceivable to calculate the parity for each of lower 6 bits and to record the obtained parity, for example by "0" or "1" respectively for even or odd parity, in the 6th and 7th bits of the addresses 125–127 as shown in FIG. 15.

Also the above-explained check procedure may be executed not only at the start of power supply but also at other occasions, such as at the replacement of the recording head.

Though the foregoing embodiment has been explained by an ink jet printer, the present invention is naturally not limited to such embodiment and applicable to various recording methods.

Among various ink jet recording methods, the present invention brings about a particular effect when applied to a recording head and a recording apparatus of so-called bubble jet system, as it realizes high-density and high-definition recording.

The principle and representative configuration of said system are disclosed, for example, in the U.S. Pat. Nos. 4,723,129 and 4,740,796. This system is applicable to so-called on-demand recording or continuous recording, but is particularly effective in the on-demand recording because, in response to the application of at least a drive signal representing the recording information to an electrothermal converter element positioned corresponding to a liquid channel or a sheet containing liquid (ink) therein, said element generates thermal energy capable of causing a rapid temperature increase exceeding the nucleus boiling point, thereby inducing film boiling on a heat action surface of the recording head and thus forming a bubble in said liquid (ink), in one-to-one correspondence with said drive signal. Said liquid (ink) is discharged through a discharge opening by the growth and contraction of said bubble, thereby forming at least a liquid droplet. Said drive signal is preferably formed as a pulse, as it realizes instantaneous growth and contraction of the bubble, thereby attaining highly responsive discharge of the liquid (ink). Such pulse-shaped drive signal is preferably that disclosed in the U.S. Pat. Nos. 4,463,359 and 4,345,262. Also the conditions described in the U.S. Pat. No. 4,313,124 relative to the temperature increase rate of said heat action surface allows to obtain further improved recording.

The configuration of the recording head is given by the combinations of the liquid discharge openings, liquid channels and electrothermal converter elements with linear or rectangular liquid channels, disclosed in the above-mentioned patents, but a configuration disclosed in the U.S. Pat. No. 4,558,333 in which the heat action part is positioned in a flexed area, and a configuration disclosed in the U.S. Pat. No. 4,459,600 also belong to the present invention. Furthermore the present invention is effective in a structure disclosed in the Japanese Patent Laid-open Application No. 59-123670, having a slit common to plural electrothermal converter elements as a discharge opening therefor, or in a structure disclosed in the Japanese Patent Laid-open Application No. 59-138461, having an aperture for absorbing the pressure wave of thermal energy, in correspondence with each discharge opening. This is because the present invention ensures secure and efficient recording, regardless of the configuration of the recording head.

Furthermore, the present invention is effectively applicable to a full-line recording head, having a length corresponding to the maximum width of recording medium, recordable on the recording apparatus. Such recording head may be obtained by plural recording heads so combined as to provide the required length, or may be constructed as a single integrated head. Also in the serial recording head as explained above, the present invention is effective in a recording head of interchangeable chip type, which can receive ink supply from the main apparatus and can be electrically connected therewith upon mounting on said main apparatus, or a recording head of cartridge type in which an ink cartridge is integrally constructed with the recording head.

Furthermore, the present invention is effective not only in an apparatus equipped with a single head corresponding to ink of a single color but also in an apparatus with plural heads corresponding to plural inks different in color or in density.

Furthermore, the ink jet recording apparatus of the present invention is not limited to a copying apparatus obtained in combination with a reader unit, but may assume the form of an image recording terminal for an information processing equipment such as a computer, or a facsimile apparatus with data transmitting and receiving functions.

What is claimed is:

1. An image recording apparatus for recording an image according to image information on a recording material, using recording means including plural recording elements, said recording means being detachable from the image recording apparatus and including memory means for storing data for correcting variations in recording density based on said plural recording elements, comprising:

discrimination means for discriminating whether the data stored in said memory means is proper on condition that said recording means is attached to said image recording apparatus; and correcting means for correcting record density based on said plural recording elements by using said data at image recording time when said discriminating means identifies that said data is proper; and warning means for warning that said recording means is not adequate when said discrimination means identifies that said data is improper.

2. An image recording apparatus according to claim 1, wherein said memory means further stores check data for discriminating whether said data is proper.

3. An image recording apparatus according to claim 2, wherein said discrimination means is adapted to identify whether said data is proper, based on said check data.

4. An image recording apparatus according to claim 3, wherein said check data is check sum data.

5. An image recording apparatus according to claim 4, wherein said data is adapted to correct variations in recording density based on said recording elements.

6. An image recording apparatus according to any of claims 4 and 5, wherein said recording means is adapted to discharge an ink droplet by driving an energy generating element according to said image information.

7. An image recording apparatus according to claim 6, wherein said energy generating element is adapted to generate thermal energy, which induces a state change in ink, thereby discharging an ink droplet from a discharge opening.

8. An image recording apparatus according to claims 4 or 5, wherein said correction means is adapted to correct the image information based on said data.

9. An image recording apparatus according to claim 8, wherein said recording means is adapted to discharge an ink droplet by driving an energy generating element according to said image information.

10. An image recording apparatus according to any of claims 4 and 5, wherein said discrimination means discriminates whether said data is proper when turning on a power source for said recording apparatus.

11. An image recording apparatus according to any of claims 4 and 5, wherein said recording means is adapted to discharge an ink droplet by driving an energy generating element according to said image information.

12. An image recording apparatus according to claim 11, wherein said discrimination means discriminates whether said data is proper when turning on a power source for said recording apparatus.

13. An image recording apparatus according to claim 12, wherein said recording means is adapted to discharge an ink droplet by driving an energy generating element according to said image information.

14. An image recording apparatus according to claims 2 or 3, wherein said check data are parity data.

15. An image recording apparatus according to claim 4, wherein said recording means is adapted to discharge an ink droplet by driving an energy generating element according to said image information.

16. An image recording apparatus according to claim 14, wherein said discrimination means discriminates whether said data is proper when turning on a power source for said recording apparatus.

17. An image recording apparatus according to claim 16, wherein said recording means is adapted to discharge an ink droplet by driving an energy generating element according to said image information.

18. An image recording apparatus according to claim 2, wherein said check data is check sum data.

19. An image recording apparatus according to claim 18, wherein said data is adapted to correct variations in recording density based on said recording elements.

20. An image recording apparatus according to claims 18 or 19, wherein said correction means is adapted to correct the image information based on said data.

21. An image recording apparatus according to claim 20, wherein said recording means is adapted to discharge an ink droplet by driving an energy generating element according to said image information.

22. An image recording apparatus according to claim 20, wherein said discrimination means discriminates whether said data is proper when turning on a power source for said recording apparatus.

23. An image recording apparatus according to claim 22, wherein said recording means is adapted to discharge an ink droplet by driving an energy generating element according to said image information.

24. An image recording apparatus according to any of claims 1-3, 18 or 19, wherein said recording means is adapted to discharge an ink droplet by driving an energy generating element according to said image information.

25. An image recording apparatus according to claim 24, wherein said energy generating element is adapted to generate thermal energy, which induces a state change in ink, thereby discharging an ink droplet from a discharge opening.

26. An image recording apparatus according to any of claims 1-3, 18 or 19, wherein said discrimination means discriminates whether said data is proper when turning on a power source for said recording apparatus.

27. An image recording apparatus according to claim 26, wherein said recording means is adapted to discharge an ink droplet by driving an energy generating element according to said image information.

* * * * *

UNITED STATES PATENT AND TRADEMARK OFFICE
CERTIFICATE OF CORRECTION

PATENT NO. : 5,289,210

DATED : February 22, 1994

INVENTOR(S) : YOSHIAKI TAKAYANAGI

It is certified that error appears in the above-identified patent and that said Letters Patent is hereby corrected as shown below:

IN THE DRAWINGS

Sheet 2 of 20, FIG. 2, "PHTORECEPTOR" should read --PHOTORECEPTOR--.
Sheet 7 of 20, FIG. 5, "(SEGUMENT)" should read --(SEGMENT)--.
Sheet 16 of 20, FIG. 13, "NOZZEL" (all occurrences) should read --NOZZLE--.

COLUMN 1

Line 24, "uneveness" should read --unevenness--.

COLUMN 2

Line 38, "nonvola-" should read --non-vola- --.

COLUMN 5

Line 33, "(n-1)-th and (n-1)-th nozzles" should read --(n-1)-th and (n-2)-th nozzles--.
Line 66, "difference" should read --different--.

COLUMN 7

Line 23, "colors," should read --colors and--.

COLUMN 8

Line 66, "there" should read --there is--.

UNITED STATES PATENT AND TRADEMARK OFFICE
CERTIFICATE OF CORRECTION

PATENT NO. : 5,289,210

DATED : February 22, 1994

INVENTOR(S) : YOSHIAKI TAKAYANAGI

It is certified that error appears in the above-identified patent and that said Letters Patent is hereby corrected as shown below:

COLUMN 9

Line 22, "stored" should read --stored in--.

COLUMN 12

Line 29, "and" should read --or--.
Line 44, "4," should read --14,--.

Signed and Sealed this

Ninth Day of August, 1994

Attest:

BRUCE LEHMAN

Attesting Officer

*Commissioner of Patents and Trademarks*